United States Patent
Shimada et al.

(10) Patent No.: US 9,446,368 B2
(45) Date of Patent: Sep. 20, 2016

(54) MIXING DEVICE FOR MIXING RAW MATERIAL AND CATALYST IN FLUID CATALYTIC CRACKING DEVICE

(71) Applicant: JX NIPPON OIL & ENERGY CORPORATION, Tokyo (JP)

(72) Inventors: Koji Shimada, Yokohama (JP); Naoya Saito, Muroran (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 14/481,112

(22) Filed: Sep. 9, 2014

(65) Prior Publication Data

US 2014/0377139 A1    Dec. 25, 2014

Related U.S. Application Data

(63) Continuation of application No. PCT/JP2013/051102, filed on Jan. 21, 2013.

(30) Foreign Application Priority Data

Apr. 27, 2012  (JP) .................. 2012-102399

(51) Int. Cl.
*B01J 8/24* (2006.01)
*B01J 8/18* (2006.01)
(Continued)

(52) U.S. Cl.
CPC ............. *B01J 8/245* (2013.01); *B01F 5/048* (2013.01); *C10G 11/18* (2013.01); *B01J 8/003* (2013.01);
(Continued)

(58) Field of Classification Search
CPC  B01J 8/245; B01J 8/003; B01J 2208/00938; B01J 2208/00831; C10G 11/16
See application file for complete search history.

(56) References Cited

U.S. PATENT DOCUMENTS 5,296,131 A * 3/1994 Raterman .............. C10G 11/18
                                                          208/113
5,997,726 A   12/1999 Fersing et al.
(Continued)

FOREIGN PATENT DOCUMENTS

EP    0 344 032 A1    11/1989
EP    0458416 A1      11/1991
(Continued)

OTHER PUBLICATIONS

International Search Report issued in International Patent Application No. PCT/JP2013/051102 dated Apr. 16, 2013 (with translation).
(Continued)

*Primary Examiner* — Lessanework Seifu
(74) *Attorney, Agent, or Firm* — Oliff PLC

(57) ABSTRACT

A mixing device used in a fluidized catalytic cracking apparatus which mixes feed and a catalyst includes a cylindrical reaction container which supplies a catalyst in a vertical direction; a plurality of feed injection nozzles arranged along an outer circumference of the reaction container; and a catalyst flow regulator which is provided in the reaction container and regulates a flow of the catalyst in the vicinity of the feed injection nozzles. The catalyst flow regulator has no feed supply function and forms a catalyst moving bed having a hollow tubular shape which is coaxial with the reaction container in the vicinity of the feed injection nozzles. The catalyst flow regulator can effectively prevent backward flow of injected fuel. Although the mixing device has a simple structure, it has a high cracking rate and maintenance of the fluidized catalytic cracking apparatus can be performed easier.

15 Claims, 4 Drawing Sheets

(51) Int. Cl.
  *C10G 11/18*    (2006.01)
  *B01F 5/04*     (2006.01)
  *B01J 8/08*     (2006.01)
  *B01J 8/00*     (2006.01)
  *B01J 8/12*     (2006.01)

(52) U.S. Cl.
  CPC ............. *B01J 8/004* (2013.01); *B01J 8/085* (2013.01); *B01J 8/12* (2013.01); *B01J 8/1881* (2013.01); *B01J 2208/00752* (2013.01); *B01J 2208/00769* (2013.01); *B01J 2208/00902* (2013.01); *B01J 2208/00938* (2013.01)

(56) References Cited

U.S. PATENT DOCUMENTS

| | | | |
|---|---|---|---|
| 6,099,720 A * | 8/2000 | Pontier | ........... C10G 11/18 208/113 |
| 6,186,658 B1 | 2/2001 | Nishida et al. | |
| 8,101,132 B2 | 1/2012 | Fujiyama et al. | |
| 2001/0000024 A1 | 3/2001 | Nishida et al. | |
| 2003/0194360 A1 | 10/2003 | Huziwara et al. | |
| 2009/0285732 A1 | 11/2009 | Naunheimer et al. | |
| 2010/0150797 A1 | 6/2010 | Fujiyama et al. | |

FOREIGN PATENT DOCUMENTS

| | | |
|---|---|---|
| JP | A-10-249178 | 9/1998 |
| JP | A-10-249179 | 9/1998 |
| WO | WO 2008/007658 A1 | 1/2008 |
| WO | 2008/076692 A1 | 6/2008 |

OTHER PUBLICATIONS

Nov. 6, 2015 extended European Search Report issued in Application No. 13781153.5.

Feb. 23, 2016 Office Action issued in Korean Application No. 10-2014-7025494.

* cited by examiner

Fig. 5

| | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| OBJECT IN CONTAINER | + | + | + | + | + | + | + |
| INTERNAL FEED SUPPLY | − | − | − | − | − | − | − |
| D(m) | 0.1 | 0.5 | 0.1 | 0.5 | 0.1 | 0.1 | 0.5 |
| d(m) | 0.034 | 0.17 | 0.068 | 0.17 | 0.006 | 0.09 | 0.17 |
| d/D (%) | 12 | 12 | 46 | 12 | 0.3 | 81 | 12 |
| h(m) | 0 | 0 | 0 | 0.1 | 0 | 0 | 0.3 |
| CRACKING RATE % BY MASS | 81.3 | 81.0 | 80.7 | 80.1 | 75.0 | 75.2 | 81.7 |
| YIELD LIGHT GAS % BY MASS | 7.7 | 7.7 | 7.8 | 8.0 | 9.2 | 8.9 | 10.5 |
| LPG % BY MASS | 36.3 | 35.6 | 35.2 | 34.2 | 30.8 | 30.9 | 33.2 |
| CCG % BY MASS | 31.5 | 31.7 | 31.4 | 31.4 | 27.4 | 27.9 | 30.1 |
| LCO % BY MASS | 11.2 | 11.3 | 11.5 | 11.9 | 14.4 | 14.1 | 11.0 |
| CLO % BY MASS | 7.5 | 7.7 | 7.8 | 8.0 | 10.6 | 10.7 | 7.3 |
| COKE % BY MASS | 5.8 | 6.0 | 6.3 | 6.5 | 7.6 | 7.5 | 7.9 |
| TOTAL % BY MASS | 100.0 | 100.0 | 100.0 | 100.0 | 100.0 | 100.0 | 100.0 |

Fig. 5 (continued page)

| | COMPARATIVE EXAMPLE 1 | COMPARATIVE EXAMPLE 2 | COMPARATIVE EXAMPLE 3 | COMPARATIVE EXAMPLE 4 |
|---|---|---|---|---|
| OBJECT IN CONTAINER | + | − | + | − |
| INTERNAL FEED SUPPLY | + | − | + | − |
| D(m) | 0.1 | 0.1 | 0.5 | 0.5 |
| d(m) | 0.034 | 0 | 0.17 | 0.17 |
| d/D (%) | 12 | 0 | 12 | 12 |
| h(m) | 0 | 0 | 0 | 0 |
| CRACKING RATE % BY MASS | 80.8 | 74.5 | 80.9 | 74.2 |
| YIELD LIGHT GAS % BY MASS | 7.8 | 9.3 | 7.9 | 9.4 |
| LPG % BY MASS | 34.8 | 30.3 | 35.1 | 29.9 |
| CCG % BY MASS | 32.1 | 27.5 | 31.9 | 27.7 |
| LCO % BY MASS | 11.7 | 14.7 | 11.6 | 14.8 |
| CLO % BY MASS | 7.5 | 10.8 | 7.5 | 11.0 |
| COKE % BY MASS | 6.1 | 7.4 | 6.0 | 7.2 |
| TOTAL % BY MASS | 100.0 | 100.0 | 100.0 | 100.0 |

MIXING DEVICE FOR MIXING RAW MATERIAL AND CATALYST IN FLUID CATALYTIC CRACKING DEVICE

CROSS REFERENCE TO RELATED APPLICATION

This application is a continuation application of International Patent Application No. PCT/JP2013/051102 filed on Jan. 21, 2013 claiming the benefit of priority of Japanese Patent Application No. 2012-102399 filed on Apr. 27, 2012. The contents of International Patent Application No. PCT/JP2013/051102 and Japanese Patent Application No. 2012-102399 are incorporated herein by reference in their entities.

BACKGROUND OF THE INVENTION

1. Field of the Invention

The present invention relates to a mixing device for mixing raw material (feed) and catalyst in fluid catalytic cracking device (fluidized catalytic cracking apparatus).

2. Description of the Related Art

A fluidized catalytic cracking apparatus is used to efficiently produce gasoline by using heavy oil as feed. An upflow moving-bed reactor in which feed oil and a catalyst (catalyst particles) are supplied from the bottom portion of the reactor to be allowed to flow upward has been used as the fluidized catalytic cracking apparatus. In the upflow moving-bed reactor, since the catalyst and the feed oil are allowed to flow against gravity, a phenomenon of back mixing in which a part of the catalyst flows downward due to gravity is caused. This phenomenon lengthens a staying time of the feed locally, and thereby causing a problem such that a reaction time becomes ununiform.

In the recent years, since a demand for light olefin used to produce chemicals is highly increased, it is required a method for producing as much of the light olefin as possible in the fluidized catalytic cracking apparatus without decreasing the production volume of the gasoline. A downflow moving-bed reactor as described in U.S. Patent Application Publication No. 2001/0000024 (corresponding to Japanese Patent Application Laid-open No. 10-249179) is suggested as an apparatus to meet the request as described above and to solve the problem of the upflow moving-bed reactor. Since the catalyst and the feed are allowed to flow in a direction which is the same as that of the gravity in the downflow moving-bed reactor, the downflow moving-bed reactor has no problem of the back mixing as described above and is capable of achieving a uniform reaction time. In the downflow moving-bed reactor, in order to produce the light olefin more efficiently, it is required to shorten a contact time during which the feed and the catalyst are contact with each other as compared with the case in which the upflow moving-bed reactor is used. Therefore, it is required to mix the feed and the catalyst quickly, and for the purpose of realizing the quick mixing, U.S. Patent Application Publication No. 2001/0000024 (corresponding to Japanese Patent Application Laid-open No. 10-249178) suggests, for example, a mixing device which includes not only an external feed supply unit provided along the outer circumference of a conventional moving-bed reactor but also a feed supply section (internal feed supply section) provided in the moving-bed reactor.

The internal feed supply section described in Japanese Patent Application Laid-open No. 10-249178 is provided with a supply pipe which is inserted into the moving-bed reactor from the exterior of the moving-bed reactor in a horizontal direction and is bent in a vertical direction in the moving-bed reactor (see FIG. 7 in Japanese Patent Application Laid-open No. 10-249178). Since such a supply pipe is provided in the moving-bed reactor, there are problems such that it is not easy to repair and/or maintain a feed injection port provided at the tip of the supply pipe and it is difficult to remove the supply pipe itself having the bend structure as described above.

In view of the above, an object of the present invention is to provide a mixing device for a fluidized catalytic cracking apparatus which has a simple structure without an internal feed supply section and which is capable of realizing an efficient mixing equivalent to a case in which the internal feed supply section is provided.

SUMMARY OF THE INVENTION

In order to achieve the object described above, inventors of the present invention found out, through a lot of diligent research and study, that an excellent mixing state of a catalyst and feed can be realized as in a case, in which an internal feed supply section is provided, just by providing a catalyst flow regulator having no feed supply function in a moving-bed reactor in a vertical direction along flow of the catalyst. Then, the inventors arrived at the present invention.

According to the present invention, there is provided a mixing device used in a fluidized catalytic cracking apparatus which mixes a feed and a catalyst, the device including:

a cylindrical reaction container configured to continuously supply the catalyst by allowing the catalyst to fall in a vertical direction;

a feed supply section configured to include a plurality of feed injection nozzles which are arranged along an outer circumference of the reaction container and through which the feed is supplied from an exterior of the reaction container to an interior of the reaction container; and a catalyst flow regulator which is arranged in the reaction container and regulates a flow of the catalyst in the vicinity of the feed injection nozzles, wherein the catalyst flow regulator has no feed supply function and is arranged to form a catalyst stream having a hollow tubular shape to be coaxial with the reaction container in the vicinity of the feed injection nozzles.

The inventors of the present invention consider function of the catalyst flow regulator used in the present invention as follows. In a case that the catalyst flows in the vertical direction in the cylindrical reaction container, a moving bed of the catalyst also has a cylindrical shape, and a cross section thereof has a circular form. In a case that fuel (feed) is injected to the outer circumference of the moving bed having the shape as described above from the feed injection nozzles, that is, in a case that the fuel (feed) is injected from the outside, it is observed a phenomenon in which a part of the fuel colliding with the catalyst is rolled upward (upstream) in the moving bed to flow in a direction opposite to a flow direction. In a case that the catalyst flows backward, the contact time during which the feed and the catalyst are contact with each other is longer than an estimated time, and thereby light gas and coke are increased. Further, a catalyst concentration is low in some cases in the vicinity of a place at which the catalyst flows backward, and thereby decreasing the cracking rate.

On the other hand, in the mixing device of the present invention, there is the catalyst flow regulator (a component for preventing rolling-up of the fuel) at the center of the reaction container, and thus a part of the fuel injected from the exterior of the a catalyst moving bed is captured by the catalyst flow regulator. Or, even when the fuel is rolled upward, the fuel is captured by a bottom surface of the catalyst flow regulator and the fuel is prevented from flowing in a direction opposite to the flow direction (flowing backward). Therefore, it is prevented that the contact time during which the feed and the catalyst are contact with each other gets longer than the estimated time, and a desired cracking rate is expected. The catalyst moving bed which has passed through the catalyst flow regulator has the hollow tubular shape (doughnut shape). Although an idea of decreasing injection pressure of the fuel to prevent the backward flow in the moving bed is also allowable, the idea is not preferable since the mixing of the feed and the catalyst deteriorates due to a slow flow rate.

In the mixing device of the present invention, in order to obtain function of the catalyst flow regulator effectively, a cross-sectional area of the catalyst flow regulator in a horizontal direction may be 10% to 50% of a cross-sectional area of the reaction container in the horizontal direction.

In order to effectively prevent the backward flow of the fuel colliding with the catalyst, a tip of a lower portion of the catalyst flow regulator is desirably arranged below a position shifted upward by a distance corresponding to D/4 (D is an inner diameter of the reaction container) from a position of a tip of each of the feed injection nozzles in a vertical direction.

In the mixing device of the present invention, in order to form the catalyst moving bed in the hollow tubular shape, the catalyst flow regulator, a reaction portion at which the feed and the catalyst react to each other, an inner wall of the reaction container, and the feed supply section may be arranged in this order from a center of the cylindrical reaction container in a horizontal direction.

In the mixing device of the present invention, in view of environment in the reaction container, the catalyst flow regulator is desirably formed of a refractory material having wear resistance.

In the mixing device of the present invention, in order to facilitate a uniform mixing of the catalyst and the feed, the feed supply section desirably has 3 to 12 feed injection nozzles, and in order to effectively prevent the backward flow of the fuel colliding with the catalyst, on an assumption that an injection angle with respect to a horizontal plane of each of the feed injection nozzles is $\theta$, the injection angle $\theta$ is desirably in a range of from 30 to 60 degrees, and more desirably in a range of from 40 to 50 degrees.

In the mixing device of the present invention, in order to suppress that the feed supplied from each of the feed injection nozzles flows toward the catalyst flow regulator and thereby the catalyst collides with the catalyst flow regulator to scrape the catalyst flow regulator off, a tip of a lower portion of the catalyst flow regulator is desirably arranged above an intersection point between an extended line of each of the feed injection nozzles and an axis of the reaction container.

In the mixing device of the present invention, the catalyst flow regulator may be a cylindrical structure, a disk-shaped structure which is bonded to an inner wall surface of the reaction container via a support portion, or a disk-shaped porous plate which is provided so that an outer circumference of the porous plate is fixed to the inner wall surface of the reaction container and has a plurality of through holes therein at a portion other than a central portion.

Particles of the catalyst used in the mixing device of the present invention may include silica and alumina as major components. Further, a particle size of the catalyst may be in a range of 1 to 400 μm.

The mixing device may further include a distribution plate which is provided on an upstream side of the catalyst flow regulator to distribute the flow of the catalyst in the reaction container uniformly. The distribution plate is desirably formed of the refractory material having the wear resistance.

A mixing device of the present invention has a simple structure just by providing a catalyst flow regulator which is not provided with an internal feed supply section in a reaction container, and it is capable of realizing an efficient mixing equivalent to a case in which the mixing device includes the internal feed supply section. Further, maintenance of the mixing device of the present invention is performed easily.

BRIEF DESCRIPTION OF THE DRAWINGS

FIG. 5 is a table indicating details of each mixing device and results of each catalytic cracking reaction in Examples and Comparative Examples.

DESCRIPTION OF THE EMBODIMENTS

Figure 1:
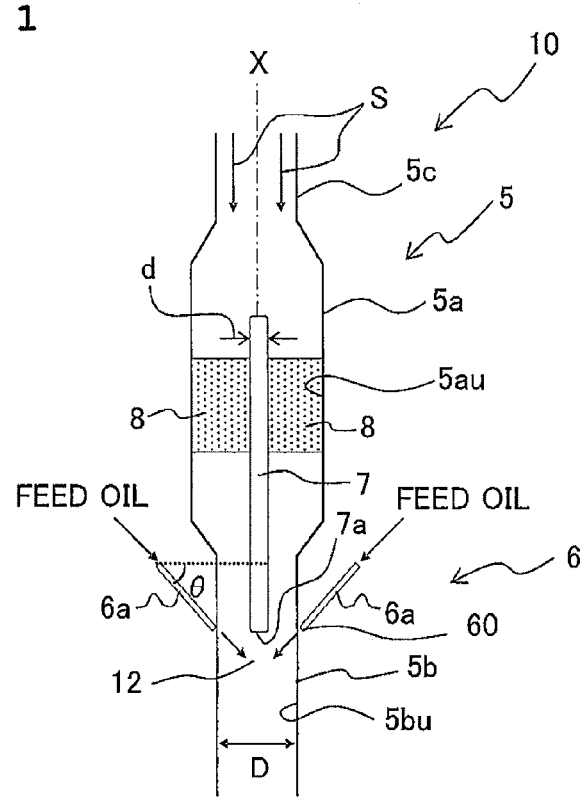
FIG. 1 is a schematic cross-sectional view of a downflow moving-bed reactor of a fluidized catalytic cracking apparatus according to the present invention.

An explanation will be made about an embodiment of the present invention with reference to FIG. 1. FIG. 1 is a schematic cross-sectional view of a downflow moving-bed reactor (mixing device) 10 of a fluidized catalytic cracking apparatus. The downflow moving-bed reactor 10 mainly includes a cylindrical reaction container 5 including a central axis X in a vertical direction (direction of gravitational force), an external feed supply unit 6 which supplies feed from the exterior to the interior of the reaction container 5, a catalyst flow regulator 7 which is disposed at the center in the reaction container 5 to regulate flow of a catalyst S, and a distribution plate 8 which is positioned on the upstream side of the catalyst flow regulator 7 to allow the catalyst S to fall uniformly. In FIG. 1, the catalyst S flows from an upper side (upstream) to a lower side (downstream) in the reaction container 5 (this direction is also referred to as "flow direction" for convenience). The catalyst is supplied from an unillustrated flow rate-regulating valve.

As shown in FIG. 1, the reaction container 5 mainly includes an upstream-side portion 5c, an expanded portion 5a which is positioned on the downstream side of the upstream-side portion 5c and has an outer diameter and an inner diameter larger than those of the upstream-side portion 5c, and a downstream-side portion 5b which is positioned on the downstream side of the expanded portion 5a and has an outer diameter and an inner diameter substantially the same as those of the upstream-side portion 5c. The distribution plate 8 is supported by an inner wall 5au of the expanded portion 5a. The distribution plate 8 is a structured packing having a structure in which many grid plates are stacked and is provided to uniformly distribute the flow of the catalyst, that is, a fluidized catalyst bed in the reaction container 5. The distribution plate 8 is formed of for example, a refractory material having wear resistance which is obtained, for example, by performing a ceramics lining to a metallic plate.

The catalyst flow regulator 7 is accommodated in the reaction container 5 at a position extending from the expanded portion 5a to the downstream-side portion 5b. The catalyst flow regulator 7 is a solid cylinder which extends to be coaxial with the central axis X of the reaction container 5, and the upper portion of the catalyst flow regulator 7 is supported by the distribution plate 8. The catalyst flow regulator 7 has no irregularity on the surface thereof and is provided in the flow direction of the reaction container 5 to reduce a catalyst flow resistance. A lower end 7a (bottom portion) of the catalyst flow regulator 7 in the flow direction is positioned in the downstream-side portion 5b of the reaction container 5. Since the catalyst flow regulator 7 has no feed supply function, maintenance required for the internal feed supply section is not required, and the catalyst flow regulator 7 is not required to be taken out of the reaction container 5.

A cross-sectional area of the catalyst flow regulator 7 in a horizontal direction (direction perpendicular to the flow direction) is preferably 0.3% to 85%, and more preferably 10% to 50% of the cross-sectional area of the reaction container 5 in the horizontal direction at a position of the lower end 7a of the catalyst flow regulator 7 in the vertical direction. In a case that the percentage of the cross-sectional area of the catalyst flow regulator 7 is low, effect of providing the catalyst flow regulator 7 can not be expected. In a case that the percentage of the cross-sectional area of the catalyst flow regulator 7 is high, a flow passage through which the feed and the catalyst are allowed to flow is small to deteriorate the mixing state and to decrease a reaction yield. Further, by providing the catalyst flow regulator 7 to be coaxial with the central axis X of the reaction container 5 at the central part in the reaction container as described above, the flow passage through which the feed and the catalyst are allowed to flow has a hollow columnar shape (doughnut shape) which is coaxial with the central axis X of the reaction container 5 especially at a reaction area 12 to which fuel is injected (in the vicinity of nozzle injection ports), and thereby making it possible to uniformly flow the feed and the catalyst at the same velocity at any place in the cross-section (concentric annulus) of the flow passage. Thus, providing the catalyst flow regulator 7 as described above is preferable.

The external feed supply unit 6 includes a plurality of feed injection nozzles 6a arranged at regular intervals on the outer circumference of the downstream-side portion 5b of the reaction container 5. 3 to 12 feed injection nozzles 6a can be provided at rotationally symmetric positions with respect to the central axis of the reaction container 5, and preferably 4 to 10 feed injection nozzles 6a can be provided. In a case that the number of the feed injection nozzles 6a is less than 3, the mixing of the feed and the catalyst is more likely to be ununiform. An angle θ of each feed injection nozzle 6a is 30° to 60°, and preferably 40° to 50° with respect to a horizontal plane (direction perpendicular to the flow direction). In a case that the angle of each feed injection nozzle 6a is smaller than 30° with respect to the horizontal plane, the feed and the catalyst have difficulty in entering into the reaction container 5 smoothly. In a case that the angle of each feed injection nozzle 6a is larger than 60°, the mixing of the feed and the catalyst becomes ununiform. An injection port 60 of each of the feed injection nozzles 6a opens at an inner wall 5bu of the downstream-side portion 5b.

In FIG. 1, the injection port 60 of each of the feed injection nozzles 6a is arranged at a height position (position in the flow direction) substantially the same as the lower end 7a of the catalyst flow regulator 7, but on the assumption that the inner diameter of the reaction container 5 is D [m], the lower end 7a of the catalyst flow regulator 7 is arranged below a position (horizontal plane) shifted upward by a distance corresponding to D/4 [m] from the horizontal plane including the injection port 60 of each of the feed injection nozzles 6a, and is preferably arranged below the horizontal plane including the injection port 60 of each of the feed injection nozzles 6a. In a case that the lower end 7a of the catalyst flow regulator 7 is arranged above the position shifted upward by the distance corresponding to D/4 with respect to the horizontal plane including the injection port 60 of each of the feed injection nozzles 6a and that the feed and the catalyst are contact with each other, the feed and gas generated are rolled upward due to the presence of a relatively-large upper space above the contact position, and thereby extending the contact time during which the feed and the catalyst are contact with each other. Thus, this arrangement is unfavorable. Further, in a case that the lower end 7a of the catalyst flow regulator 7 is disposed at a position significantly below the horizontal plane including the injection port 60 of each of the feed injection nozzles 6a, the feed injected from each of the feed injection nozzles 6a is allowed to flow toward the catalyst flow regulator 7, which increases the possibility that the catalyst collides with the catalyst flow regulator 7 to scrape the catalyst flow regulator 7 off. Accordingly, although depending on the angle of each of the nozzles, the catalyst flow regulator 7 is desirably disposed above a position extended in a direction in which the feed is injected from each of the feed injection nozzles 6a (position at which the extended line of each of the feed injection nozzles 6a intersects with the central axis X).

Figure 2:
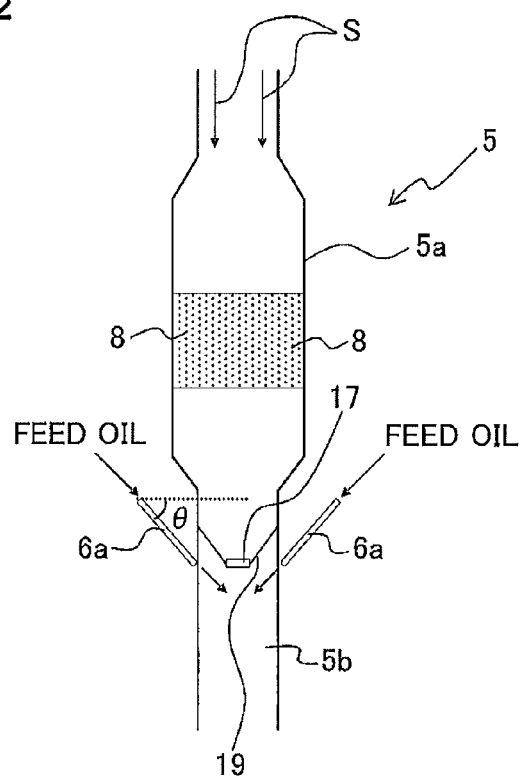
FIG. 2 is a schematic cross-sectional view of a downflow moving-bed reactor which includes a catalyst flow regulator having another structure.
Figure 3:
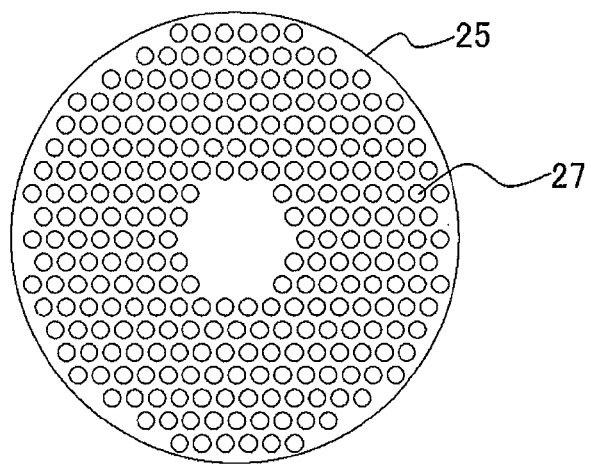
FIG. 3 is a plan view of a catalyst flow regulator having a structure different from catalyst flow regulators as shown in FIGS. 1 and 2.

The catalyst flow regulator 7 may have any shape and structure provided that the flow of the catalyst can be regulated in the hollow columnar shape. In this embodiment, although the solid columnar structure is used, a hollow columnar structure may be used. Further, the catalyst flow regulator 7 may be a disk-shaped structure 17 which is bonded to an inner wall surface of the downflow moving-bed reactor 10 via a support portion 19 as shown in FIG. 2. In this case, a plurality of support portions 19 are desirably provided at rotationally symmetric positions in the inner wall surface in such a way that the area in the horizontal plane is allowed to be as small as possible in order not to obstruct the flow of the catalyst. Alternatively, as shown in FIG. 3, it is possible to use a disk-shaped porous plate 25 in which many through holes 27 are formed. The disk-shaped porous plate 25 is provided so that the outer circumference thereof is fixed to the inner wall surface (inner circumferential surface) of the downflow moving-bed reactor 10. Since the disk-shaped porous plate 25 has no through hole 27 at the central portion thereof, a catalyst stream can not pass through the central portion, and the catalyst stream which has passed through the disk-shaped porous plate 25 is allowed to be a hollow tubular shape which is coaxial with the downflow moving-bed reactor 10. The central portion of the porous plate 25 particularly functions as a catalyst flow-regulating portion of the catalyst flow regulator 7. A pore size of the through hole can be, for example, 0.5 cm to 5 cm.

A material of the catalyst flow regulator 7 is preferably a material which is stable at high temperature and has the wear resistance such as the refractory material having the wear resistance, like ceramics, because a reaction is caused at a temperature normally about 400 to 700 degrees Celsius in the fluidized catalytic cracking apparatus and a granular catalyst flows at high speed.

As feed oil supplied to the mixing device for the fluidized catalytic cracking apparatus of the present invention, any feed oil can be used provided that the feed oil is feed oil used for fluidized catalytic cracking. The feed oil generally used is exemplified, for example, by desulfurized vacuum gas oil, non-desulfurized vacuum gas oil, desulfurized straight run gas oil, non-desulfurized straight run gas oil, desulfurized cracked gas oil, non-desulfurized cracked gas oil, desulfurized atmospheric distillation residue, non-desulfurized atmospheric distillation residue, desulfurized vacuum distillation residue, non-desulfurized vacuum distillation residue, desulfurized deasphalted oil, and non-desulfurized deasphalted oil. Any feed oil other than oils described above may be used.

As the catalyst supplied to the mixing device for the fluidized catalytic cracking apparatus of the present invention, any catalyst generally used for the fluidized catalytic cracking apparatus can be used. The catalyst generally used is exemplified, for example, by a catalyst which has a particle size of 1 to 400 μm and of which major components are silica and alumina.

Since the fluidized catalytic cracking reaction is caused at the high temperature, the reaction container and any device equipped to the fluidized catalytic cracking apparatus are also constructed of a metal and/or the refractory material. Thus, it is difficult to directly observe the mixing state of the feed and the catalyst under a reaction condition. A theoretical calculation of the mixing state is carried out by using Computational Fluid Dynamics (CFD) to judge as to whether or not the mixing state is good. The mixing state is directly linked to a yield of a reaction product. That is, even if exit temperature of the reaction container, ratio of the catalyst with respect to the feed, and the contact time during which the feed and the catalyst are contact with each other are the same, in a case that the mixing state of the feed and the catalyst is different, cracking rate and/or yield distribution of the product are different. In a case that the mixing state is bad, the cracking rate is decreased; and yield(s) of light gas and/or coke in a cracked product is/are increased. Even when the mixing state is good, in a case that the feed and the gas are rolled upward to extend the contact time during which the feed and the catalyst are contact with each other, the yield(s) of the light gas and/or the coke in the cracked product is/are significantly increased, though the cracking rate is not decreased. Therefore, it can be known whether the mixing state is good or not, and whether the rolling-up of the feed and the gas is present or not by reacting those different in mixing methods under the same reaction condition and then comparing their cracking rates and yield distributions of the products, and thereby performance of the mixing device can be evaluated. In the present invention, since the calculation of the mixing state is carried out, the yield distribution of the product in which the mixing state is reflected is found by using a theoretical reaction analysis calculation.

EXAMPLES

Hereinbelow, the present invention is described in greater detail through Examples, but the present invention is not limited thereto.

Example 1

Preconditions of the CFD and the reaction analysis are described below. The downflow moving-bed reactor 10 used for the CFD and the reaction analysis is shown in FIG. 1. Desulfurized vacuum gas oil derived from Middle-Eastern crude oil was used as the feed, and quality of the desulfurized vacuum gas oil was as follows: density at 15 degrees Celsius 0.897 g/cm$^3$, remaining coal 0.2% by mass, sulfur content 0.13% by mass, nitrogen content 0.04% by mass, initial distillation temperature 346 degrees Celsius, 50% distillation temperature 463 degrees Celsius, 90% distillation temperature 557 degrees Celsius. Further, as the catalyst, a catalyst for fluidized catalytic cracking ($SiO_2$: 80% by weight, $Al_2O_3$: 20% by weight) to produce light olefin and gasoline from heavy oil was used. A bulk density of the catalyst was 0.73 g/ml and a surface area was 280 m$^2$/g. Validity of the CFD and the reaction analysis using the feed oil and the catalyst as described above was confirmed separately by experiments.

In the downflow moving-bed reactor 10 of FIG. 1, a diameter D of the downstream-side portion 5b of the reaction container 5 was 0.1 m, the external feed supply unit 6 had 6 feed injection nozzles, and the injection angle with respect to the horizontal plane was 45°. The catalyst flow regulator 7 was formed of stainless steel, had the cylindrical shape, was provided to be coaxial with the reaction container 5, had a diameter d of 0.034 m, and had a length of 0.35 m. That is, the area of the horizontal cross section of the catalyst flow regulator 7 was 12% of the area of the horizontal cross section of the downstream-side portion 5b of the reaction container 5. Further, the lower end 7a of the catalyst flow regulator 7 and the injection port 60 of each of the feed injection nozzles 6a were positioned on the same plane (same position in the vertical direction). As the reaction condition, the exit temperature of the reaction container was 600 degrees Celsius, the ratio of the catalyst with respect to the feed was 25 mass ratio, and the contact time during which the feed and the catalyst are contact with each other was 0.5 second.

Results of catalytic cracking reaction using this mixing device are shown in TABLE shown in FIG. 5. In TABLE, the cracking rate is defined as 100—(LCO yield+CLO yield). That is, in the product, LCO (Light Cycle Oil) and CLO (Clarified Oil) are non-cracked contents, and those other than LCO (Light Cycle Oil) and CLO (Clarified Oil) are the cracked products. Further, d/D indicates ratio (%) of a horizontal cross-sectional area d of the lower end 7a of the catalyst flow regulator 7 with respect to a horizontal cross-sectional area D of the downstream-side portion 5b of the reaction container 5; and h indicates a height position (m) of the injection port 60 of each of the feed injection nozzles 6a from a position of the lower end 7a of the catalyst flow regulator 7.

Example 2

Other than the diameter D of the downstream-side portion 5b of the reaction container 5 of the downflow moving-bed reactor 10 was 0.5 m and the diameter d of the catalyst flow regulator 7 was 0.17 m, the CFD and the reaction analysis were performed by using the same catalyst, the same feed, and the same reaction conditions as those of Example 1. That is, in Example 2, the horizontal cross-sectional area of the catalyst flow regulator 7 was 12% of the horizontal cross-sectional area of the downstream-side portion 5b of the reaction container 5 as in Example 1. Calculation results of Example 2 are indicated in TABLE of FIG. 5.

Example 3

Other than the diameter D of the downstream-side portion 5b of the reaction container 5 of the downflow moving-bed reactor 10 was 0.1 m and the diameter d of the catalyst flow regulator 7 was 0.068 m, the CFD and the reaction analysis were performed by using the same catalyst, the same feed, and the same reaction conditions as those of Example 1. That is, in Example 3, the cross-sectional area of the catalyst flow regulator 7 in the horizontal direction was 46% of the horizontal cross-sectional area of the downstream-side portion 5b of the reaction container 5. Calculation results of Example 3 are indicated in TABLE of FIG. 5.

Example 4

Other than the diameter D of the downstream-side portion 5b of the reaction container 5 of the downflow moving-bed reactor 10 was 0.5 m, the diameter d of the catalyst flow regulator 7 was 0.17 m, and the tip of the catalyst flow regulator 7 was disposed at a position shifted upward by 0.1 m with respect to the horizontal plane including the tip of each of the feed injection nozzles 6a of the external feed supply unit 6, the CFD and the reaction analysis were performed by using the same catalyst, the same feed, and the same reaction conditions as those of Example 1. That is, in Example 4, the horizontal cross-sectional area of the catalyst flow regulator 7 was 12% of the horizontal cross-sectional area of the downstream-side portion 5b of the reaction container 5. Calculation results of Example 4 are indicated in TABLE of FIG. 5.

Example 5

Other than the diameter D of the downstream-side portion 5b of the reaction container 5 of the downflow moving-bed reactor 10 was 0.1 m and the diameter d of the catalyst flow regulator 7 was 0.006 m, the CFD and the reaction analysis were performed by using the same catalyst, the same feed, and the same reaction conditions as those of Example 1. That is, in Example 5, the horizontal cross-sectional area of the catalyst flow regulator 7 was 0.3% of the horizontal cross-sectional area of the downstream-side portion 5b of the reaction container 5. Calculation results of Example 5 are indicated in TABLE of FIG. 5. When comparing Example 1 and Example 5, the cracking rate was low and the yields of the light gas and the coke in the cracked product were increased in Example 5. It was clear from the calculation results of the CFD in Example 5 that, since the ratio of the horizontal cross-sectional area of the catalyst flow regulator 7 with respect to the horizontal cross-sectional area of the downstream-side portion 5b of the reaction container 5 was extremely low, the catalyst flow regulator 7 did not function. When comparing Examples 1, 2, and 4 and Example 5, ratio d/D of the horizontal cross-sectional area d of the catalyst flow regulator 7 with respect to the horizontal cross-sectional area of the downstream-side portion 5b of the reaction container 5 is preferably not less than 10%, and more preferably not less than 12%.

Example 6

Other than the diameter D of the downstream-side portion 5b of the reaction container 5 of the downflow moving-bed reactor 10 was 0.1 m and the diameter d of the catalyst flow regulator 7 was 0.09 m, the CFD and the reaction analysis were performed by using the same catalyst, the same feed, and the same reaction conditions as those of Example 1. That is, in Example 6, the horizontal cross-sectional area of the catalyst flow regulator 7 was 81% of the horizontal cross-sectional area of the downstream-side portion 5b of the reaction container 5. Calculation results of Example 6 are indicated in TABLE of FIG. 5. When comparing Example 1 and Example 6, the cracking rate was low and the yields of the light gas and the coke in the cracked product were increased in Example 6. It was clear from the calculation results of the CFD in Example 6 that, since the ratio of the horizontal cross-sectional area of the catalyst flow regulator 7 with respect to the horizontal cross-sectional area of the downstream-side portion 5b of the reaction container 5 was high, the mixing state was not good. When comparing Example 3 and Example 6, ratio d/D of the horizontal cross-sectional area d of the catalyst flow regulator 7 with respect to the horizontal cross-sectional area of the downstream-side portion 5b of the reaction container 5 is preferably not more than 50%, and more preferably not more than 46%. Accordingly, the ratio d/D is preferably 10%≤d/D≤50%.

Example 7

Other than the lower end 7a of the catalyst flow regulator 7 of the downflow moving-bed reactor 10 was disposed at a position shifted upward by 0.3 m with respect to the horizontal plane including the injection port 60 of each of the feed injection nozzles 6a of the external feed supply unit 6, the CFD and the reaction analysis were performed by using the same catalyst, the same feed, and the same reaction conditions as those of Example 4. Reaction results of Example 7 are indicated in TABLE of FIG. 5. When comparing Example 4 and Example 7, although the cracking rate in Example 7 was equivalent to that in Example 4, the yields of the light gas and the coke in the cracked product were increased in Example 7. It was clear from the calculation results of the CFD in Example 7 that the feed and the gas generated were rolled upward due to the presence of the relatively large space above the injection port 60 of each of the feed injection nozzles 6a, and thereby increasing the contact time during which the feed and the catalyst are contact with each other.

Comparative Example 1

Figure 4:
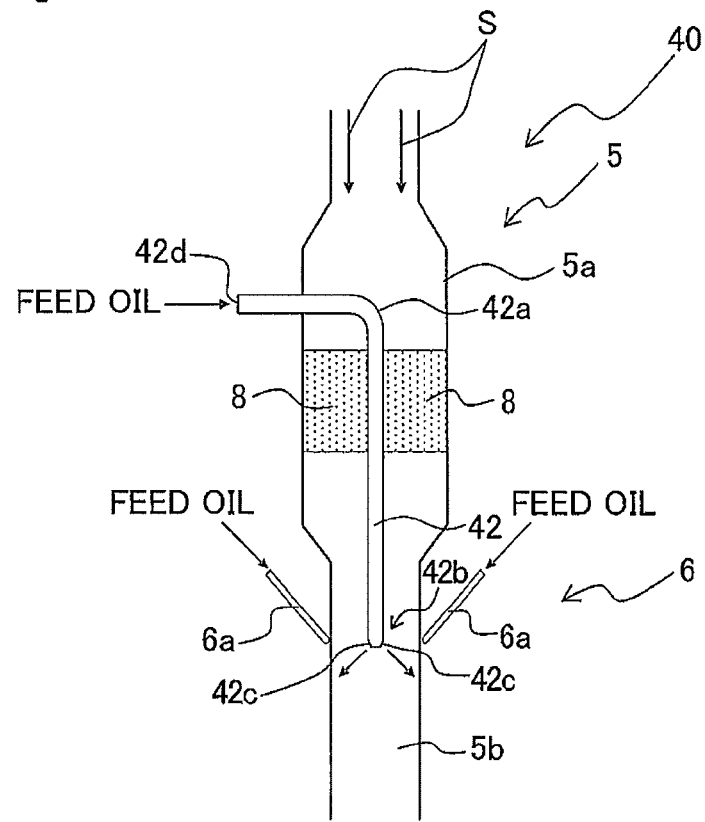
FIG. 4 is a schematic cross-sectional view of a downflow moving-bed reactor of a fluidized catalytic cracking apparatus used in Comparative Example 1.

The calculation which is the same as or equivalent to that of Example 1 was performed on the assumption that a downflow moving-bed reactor 40 as shown in FIG. 4 was used. The downflow moving-bed reactor 40 was different from the downflow moving-bed reactor 10 of Example 1 in that an internal feed supply unit 42 having the feed supply function was used instead of the catalyst flow regulator 7 used in Example 1. The internal feed supply unit 42 included a bent pipe 42a having an internal flow passage and a plurality of feed injection nozzles 42c arranged at a downstream-side end portion 42b of the bent pipe 42a. An upstream-side end portion 42d of the bent pipe 42a penetrated through a side wall of the expanded portion 5a of the reaction container 5 to be connected to a feed supply source (not shown) for supplying feed which is the same as that supplied from the external feed supply unit 6. The diameter D of the downstream-side portion 5b of the reaction container 5 was 0.1 m and the diameter (d) of the bent pipe 42a of the internal feed supply unit 42 was 0.034 m. The preconditions for the feed, the catalyst, and the reaction conditions were the same as those in Example 1. Calculation results of Comparative Example 1 are indicated in TABLE of FIG. 5. It was clear from the results indicated in TABLE that the cracking rate and the yield distribution of the product in Comparative Example 1 were substantially equivalent to the results of Example 1. However, as shown in FIG. 4, the downflow moving-bed reactor 40 had a complicated structure requiring the internal feed supply unit 42 and it was not easy to perform the maintenance due to the complicated structure.

Comparative Example 2

Other than the catalyst flow regulator 7 was removed from the downflow moving-bed reactor 10 used in Example 1, the CFD and the reaction analysis were performed on the assumption that the downflow moving-bed reactor 10 having the same structure and size as those of the downflow moving-bed reactor 10 in Example 1 was used and that the feed, the catalyst, and the reaction conditions, those of which were similar to those of Example 1, were used. Calculation results of Comparative Example 2 are indicated in TABLE of FIG. 5. When comparing Comparative Example 2 and Example 1, the cracking rate was low and the yields of the light gas and the coke in the cracked product were increased in Comparative Example 2.

Comparative Example 3

Other than the diameter of the downstream-side portion 5b of the reaction container 5 was 0.5 m and the diameter of the bent pipe 42a of the internal feed supply unit 42 was 0.017 m, the CFD and the reaction analysis were performed by using the downflow moving-bed reactor 40 of Comparative Example 1 in a similar manner to Comparative Example 1. Comparative Example 3 can be compared to Example 2. Calculation results of Comparative Example 3 are indicated in TABLE of FIG. 5. The cracking rate and the yield distribution of the product were substantially equivalent to those of Example 2. From this, although the downflow moving-bed reactor of Example 2 had the simple structure, it was capable of obtaining the performance equivalent to the downflow moving-bed reactor having the internal feed supply section.

Comparative Example 4

Other than the catalyst flow regulator 7 was removed from the downflow moving-bed reactor 10 used in Example 2, the CFD and the reaction analysis were performed on the assumption that the downflow moving-bed reactor 10 having the same structure and size as those of the downflow moving-bed reactor 10 in Example 2 was used and that the feed, the catalyst, and the reaction conditions, those of which were similar to those of Example 1, were used. Calculation results of Comparative Example 4 are indicated in TABLE of FIG. 5. When comparing Comparative Example 4 and Example 2, the cracking rate was low and the yields of the light gas and the coke in the cracked product were increased in Comparative Example 4.

In the above description, the moving-bed reactor (mixing device) used in the fluidized catalytic cracking apparatus of the present invention was explained by using Examples. The present invention, however, is not limited to the specific aspects, and can be modified within technical idea described in CLAIMS. It is possible to appropriately change arrangement positions, shapes, and structures of the reaction container, the catalyst flow regulator, the distribution plate, the injection nozzles, and the like. For example, the distribution plate may not be provided in the reaction container 5.

Although the mixing device used in the fluidized catalytic cracking apparatus of the present invention has the simple structure without the internal feed supply section, the cracking rate of the feed is high, generation of the cracked product such as the light gas and the coke can be reduced, and it is possible to perform the maintenance easily. Therefore, it is possible to supply a fluidized catalytic cracking apparatus having an excellent structure at low cost, which contributes to development of oil industry in our country.

What is claimed is:

1. A mixing device used in a fluidized catalytic cracking apparatus which mixes a feed and a catalyst, the device comprising:
   a cylindrical reaction container configured to continuously supply the catalyst by allowing the catalyst to fall in a vertical direction;
   a feed supply section configured to include a plurality of feed injection nozzles which are arranged along an outer circumference of the reaction container and through which the feed is supplied from an exterior of the reaction container to an interior of the reaction container; and
   a catalyst flow regulator which is arranged in the reaction container and regulates a flow of the catalyst in the vicinity of the feed injection nozzles,
   wherein the catalyst flow regulator has no feed supply function and is arranged to form a catalyst stream having a hollow tubular shape to be coaxial with the reaction container in the vicinity of the feed injection nozzles,
   wherein on an assumption that an injection angle with respect to a horizontal plane of each of the feed injection nozzles is θ, the injection angle θ is in a range of from 30 to 60 degrees, and
   wherein a tip of a lower portion of the catalyst flow regulator is arranged above an intersection point between an extended line of each of the feed injection nozzles and an axis of the reaction container.

2. The mixing device according to claim 1, wherein a cross-sectional area of the catalyst flow regulator in a horizontal direction is 10% to 50% of a cross-sectional area of the reaction container in the horizontal direction.

3. The mixing device according to claim 1, wherein the catalyst flow regulator, a reaction portion at which the feed and the catalyst react to each other, an inner wall of the reaction container, and the feed supply section are arranged in this order from a center of the cylindrical reaction container in a horizontal direction.

4. The mixing device according to claim 1, wherein the catalyst flow regulator is formed of a refractory material having wear resistance.

5. The mixing device according to claim 1, wherein the feed supply section has 3 to 12 feed injection nozzles.

6. The mixing device according to claim 5, wherein the injection angle θ is in a range of from 40 to 50 degrees.

7. The mixing device according to claim 1, wherein the catalyst flow regulator has a cylindrical structure.

8. The mixing device according to claim 1, wherein the catalyst flow regulator is a disk-shaped porous plate which is provided so that an outer circumference of the porous plate is fixed to an inner wall surface of the reaction container and has a plurality of through holes therein at a portion other than a central portion.

9. The mixing device according to claim 1, wherein particles of the catalyst include silica and alumina as major components.

10. The mixing device according to claim 1, wherein a particle size of the catalyst is in a range of 1 to 400 µm.

11. The mixing device according to claim 1, further comprising a distribution plate which is provided on an upstream side of the catalyst flow regulator to distribute the flow of the catalyst in the reaction container uniformly.

12. The mixing device according to claim 11, wherein the distribution plate is formed of a refractory material having wear resistance.

13. A mixing device used in a fluidized catalytic cracking apparatus which mixes a feed and a catalyst, the device comprising:
   a cylindrical reaction container configured to continuously supply the catalyst by allowing the catalyst to fall in a vertical direction;
   a feed supply section configured to include a plurality of feed injection nozzles which are arranged along an outer circumference of the reaction container and through which the feed is supplied from an exterior of the reaction container to an interior of the reaction container; and
   a catalyst flow regulator which is arranged in the reaction container and regulates a flow of the catalyst in the vicinity of the feed injection nozzles,
   wherein the catalyst flow regulator has no feed supply function and is arranged to form a catalyst stream having a hollow tubular shape to be coaxial with the reaction container in the vicinity of the feed injection nozzles,
   wherein on an assumption that an injection angle with respect to a horizontal plane of each of the feed injection nozzles is 0, the injection angle θ is in a range of from 30 to 60 degrees, and
   wherein a tip of a lower portion of the catalyst flow regulator is arranged below a position shifted upward by a distance corresponding to D/4 (D is an inner diameter of the reaction container) from a position of a tip of each of the feed injection nozzles in a vertical direction.

14. A mixing device used in a fluidized catalytic cracking apparatus which mixes a feed and a catalyst, the device comprising:
   a cylindrical reaction container configured to continuously supply the catalyst by allowing the catalyst to fall in a vertical direction;
   a feed supply section configured to include a plurality of feed injection nozzles which are arranged along an outer circumference of the reaction container and through which the feed is supplied from an exterior of the reaction container to an interior of the reaction container; and
   a catalyst flow regulator which is arranged in the reaction container and regulates a flow of the catalyst in the vicinity of the feed injection nozzles,
   wherein the catalyst flow regulator has no feed supply function and is arranged to form a catalyst stream having a hollow tubular shape to be coaxial with the reaction container in the vicinity of the feed injection nozzles, and
   wherein the catalyst flow regulator has a disk-shaped structure which is bonded to an inner wall surface of the reaction container via a support portion.

15. A mixing device used in a fluidized catalytic cracking apparatus which mixes a feed and a catalyst, the device comprising:
   a cylindrical reaction container configured to continuously supply the catalyst by allowing the catalyst to fall in a vertical direction;
   a feed supply section configured to include a plurality of feed injection nozzles which are arranged along an outer circumference of the reaction container and through which the feed is supplied from an exterior of the reaction container to an interior of the reaction container; and
   a distribution plate supported by an inner wall of the reaction container,
   a catalyst flow regulator which is arranged in the reaction container and is supported by the distribution plate and which regulates a flow of the catalyst in the vicinity of the feed injection nozzles,
   wherein the catalyst flow regulator has no feed supply function and is arranged to form a catalyst stream having a hollow tubular shape to be coaxial with the reaction container in the vicinity of the feed injection nozzles.

* * * * *